(12) United States Patent
Menon et al.

(10) Patent No.: US 12,493,682 B2
(45) Date of Patent: Dec. 9, 2025

(54) STRONG AUTHENTICATION OF A USER OF A COMMUNICATION TERMINAL

(71) Applicant: Orange, Issy-les-Moulineaux (FR)

(72) Inventors: Bruno Menon, Châtillon (FR); Paul Tchoumi, Châtillon (FR); Didier Prudon, Châtillon (FR); Mathias Beldame, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 147 days.

(21) Appl. No.: 17/914,626

(22) PCT Filed: Mar. 5, 2021

(86) PCT No.: PCT/FR2021/050381
§ 371 (c)(1),
(2) Date: Sep. 26, 2022

(87) PCT Pub. No.: WO2021/191519
PCT Pub. Date: Sep. 30, 2021

(65) Prior Publication Data
US 2023/0120373 A1    Apr. 20, 2023

(30) Foreign Application Priority Data
Mar. 27, 2020 (FR) .................................. 2003059

(51) Int. Cl.
*G06F 21/44* (2013.01)
*G06F 21/45* (2013.01)

(52) U.S. Cl.
CPC .............. *G06F 21/44* (2013.01); *G06F 21/45* (2013.01)

(58) Field of Classification Search
CPC .................................. G06F 21/44; G06F 21/45
(Continued)

(56) References Cited

U.S. PATENT DOCUMENTS

| 6,693,894 B1* | 2/2004 | Andersson ............ H04W 76/12 370/352 |
| 2003/0037004 A1 | 2/2003 | Buffum et al. |

(Continued)

FOREIGN PATENT DOCUMENTS

| CN | 102393943 A | 3/2012 |
| CN | 105991280 A | 10/2016 |

(Continued)

OTHER PUBLICATIONS

International Search Report and Written Opinion dated May 28, 2021 for Application No. PCT/FR2021/050381.
(Continued)

*Primary Examiner* — Michael S McNally
(74) *Attorney, Agent, or Firm* — Knobbe, Martens, Olson & Bear, LLP

(57) ABSTRACT

A method for authenticating a user of a service on a communication terminal is performed by the communication terminal. The method includes transmitting to a server a request to access the server, the request comprising an identifier associated with the communication terminal and an identifier associated with a required service in the server, receiving, from an authentication device, an authentication request asking the user to pronounce at least one word, and communicating the at least one word pronounced by the user to the device. When the at least one pronounced word corresponds to a voiceprint of the user stored beforehand in association with the identifier of said communication terminal, the terminal then accesses the service or or receives from the device an additional user authentication request.

19 Claims, 6 Drawing Sheets

(58) Field of Classification Search
USPC .......................................................... 726/17
See application file for complete search history.

(56) References Cited

U.S. PATENT DOCUMENTS

| | | | |
|---|---|---|---|
| 2012/0253810 A1* | 10/2012 | Sutton ..................... | G10L 17/24 704/E15.001 |
| 2013/0080166 A1* | 3/2013 | Buffum .................... | G07C 9/37 704/236 |
| 2014/0275807 A1* | 9/2014 | Redei ..................... | G16H 40/67 600/300 |
| 2017/0279795 A1* | 9/2017 | Redberg ............. | H04L 63/0861 |
| 2018/0205822 A1 | 7/2018 | Gupta | |
| 2018/0341760 A1* | 11/2018 | Frempong ............ | H04W 12/63 |
| 2019/0259390 A1 | 8/2019 | Summerfield et al. | |

FOREIGN PATENT DOCUMENTS

| | | |
|---|---|---|
| CN | 108141760 A | 6/2018 |
| GB | 2547885 A | 9/2017 |

OTHER PUBLICATIONS

Chinese Office Action dated Feb. 28, 2025 for Application No. CN202180024957.8.

Xia Mingzhong, Xu Yaming, Xia Yixuan; Application of users' centralized and unified certification to information-based construction of xinjiang oilfield company, Computers and Applied Chemistry, No. 08, Aug. 28, 2010.

* cited by examiner

STRONG AUTHENTICATION OF A USER OF A COMMUNICATION TERMINAL

Related Applications

This application is the U.S. National Phase of Application No. PCT/FR2021/050381 entitled "STRONG AUTHENTICATION OF A USER OF A COMMUNICATION TERMINAL" and filed Mar. 5, 2021, which claims the benefit of French Patent Application No. 2003059, filed Mar. 27, 2020, each of which is incorporated by reference in its entirety.

FIELD OF THE INVENTION

The present invention relates in general to the field of strong authentication of a user of a communication terminal. The present invention applies more particularly to the authentication of a user who requests access to a service by way of any type of communication terminal, including communication terminals not equipped with Internet access capabilities.

PRIOR ART

At present, despite smartphones having been present on the market for a good ten years, basic communication terminals, also called "feature phones" or "basic phones", remain popular. Since such basic communication terminals are not equipped with means for accessing the Internet, the use of high-value-added services is relatively limited because it requires strong authentication of the user. A user who requests access to a service by way of a basic communication terminal is generally authenticated using the number of his mobile telephone, that is to say his MSISDN (Mobile Station International Subscriber Directory Number) number.

AIM AND SUMMARY OF THE INVENTION

One of the aims of the invention is to rectify the drawbacks of the abovementioned prior art by offering users of communication terminals, whether or not they are basic, access to more services, in particular those requiring strong authentication of the user, such as for example a banking service, which is simple to implement for all of these terminals.

To this end, one subject of the present invention relates to a method for authenticating a user of a service on a communication terminal, comprising the following, on the communication terminal:
  sending, to a server, a request to access said server, said request comprising a first identifier associated with the communication terminal and a second identifier associated with a service requested in said server,
  receiving, from an authentication device, an authentication request asking the user to speak at least one word,
  communicating said at least one word spoken by the user to the device,
  said at least one spoken word corresponding to a voiceprint of the user recorded beforehand in association with the identifier of said communication terminal,
  accessing the service or receiving, from the device, an additional authentication request for additional authentication of the user.

The sequence of the abovementioned operations thus advantageously allows the user of a communication terminal, be this a smartphone or still not equipped with Internet access capabilities, as is the case for a basic terminal, to very securely access a service that handles sensitive data specific to the user (banking or medical data of the user for example), by virtue of:
  recognition of the identifier of the communication terminal, such as for example the telephone number, which is coupled to
  a voice biometrics mechanism.

According to one particular embodiment, the received additional authentication request is a password request, to which the terminal communicates, in response, the requested password in text or voice form.

The receipt of such a password request makes it possible to further improve the security of access to the service requested by the communication terminal by providing an additional level of authentication for the user.

According to another particular embodiment, the second identifier associated with the requested service belongs to the group comprising a dual-tone multi-frequency tone code, a USSD ("Unstructured Supplementary Service Data") code, and an SMS ("Short Message Service") message.

By virtue of using a DTMF (abbreviation for "dual-tone multi-frequency"), USSD or SMS communication channel, the advantage of which is that of being widely used on the majority of communication terminals on the market, and in particular on communication terminals not equipped with Internet access capabilities, it is thus possible to secure this type of access by providing the user with strong, or even very strong, authentication of said user. The level of fraud on this type of access is greatly reduced.

According to another particular embodiment, the at least one spoken word that is communicated to the authentication device is identified according to at least one physical characteristic of the user.

The advantage of using at least one physical characteristic of the user to identify said at least one word spoken by said user is that this type of characteristic is impossible to reproduce for a malicious individual who would like to fraudulently access the service requested by the user. The reliability of accessing services using basic terminals is therefore thus increased.

According to another particular embodiment, said at least one physical characteristic belongs to the group comprising intonation, speed, and the accent with which the user speaks the word.

The various abovementioned embodiments or implementation features may be added, independently or in combination with one another, to the authentication method defined above.

The invention also relates to a communication terminal for implementing authenticated access of a user to a service, said terminal comprising a processor that is configured to implement the following:
  sending, to a server, a request to access the server, the request comprising a first identifier associated with the communication terminal and a second identifier associated with the service requested in the server,
  receiving, from an authentication device, an authentication request asking the user to speak at least one word,
  communicating said at least one word spoken by the user to the device,
  said at least one spoken word corresponding to a voiceprint of the user recorded beforehand in association with the identifier of said communication terminal,
  accessing the service or receiving, from the device, an additional authentication request for additional authentication of the user.

The invention also relates to a device for authenticating a user of a service accessed by way of a communication terminal, the device comprising a processor that is configured to implement the following:

receiving, from a server that has received a request to access said server sent by the communication terminal, a first identifier associated with the communication terminal and a second identifier associated with the service requested in the server, sending, to the communication terminal associated with the first identifier, an authentication request asking the user to speak at least one word, receiving the spoken word from the terminal, said at least one spoken word corresponding to a voiceprint of the user recorded beforehand in association with the first identifier, authorizing the terminal to access the service or sending, to the terminal, an additional authentication request for additional authentication of the user.

The invention also relates to an authentication system comprising the abovementioned terminal and authentication device.

The invention also relates to a computer program comprising instructions for implementing the authentication method according to the invention according to any one of the particular embodiments described above when said program is executed by a processor.

Such instructions may be stored durably in a non-transient memory medium of the communication terminal implementing the abovementioned authentication method. This program may use any programming language and be in the form of source code, object code or intermediate code between source code and object code, such as in a partially compiled form, or in any other desirable form.

The invention also targets a computer-readable recording medium or information medium comprising instructions of a computer program as mentioned above.

The recording medium may be any entity or device capable of storing the program. For example, the medium may comprise a storage means, such as a ROM, for example a CD-ROM or a microelectronic circuit ROM, or else a magnetic recording means, for example a USB key or a hard disk.

Moreover, the recording medium may be a transmissible medium such as an electrical or optical signal, which may be conveyed via an electrical or optical cable, by radio or by other means. The program according to the invention may in particular be downloaded from a network such as the Internet.

As an alternative, the recording medium may be an integrated circuit in which the program is incorporated, the circuit being designed to execute or to be used in the execution of the abovementioned authentication method.

BRIEF DESCRIPTION OF THE DRAWINGS

Other features and advantages will become apparent from reading particular embodiments of the invention, which are given by way of illustrative and non-limiting examples, and the appended drawings, in which.

DETAILED DESCRIPTION OF ONE EMBODIMENT OF THE INVENTION

Architectural Environment

Figure 1:
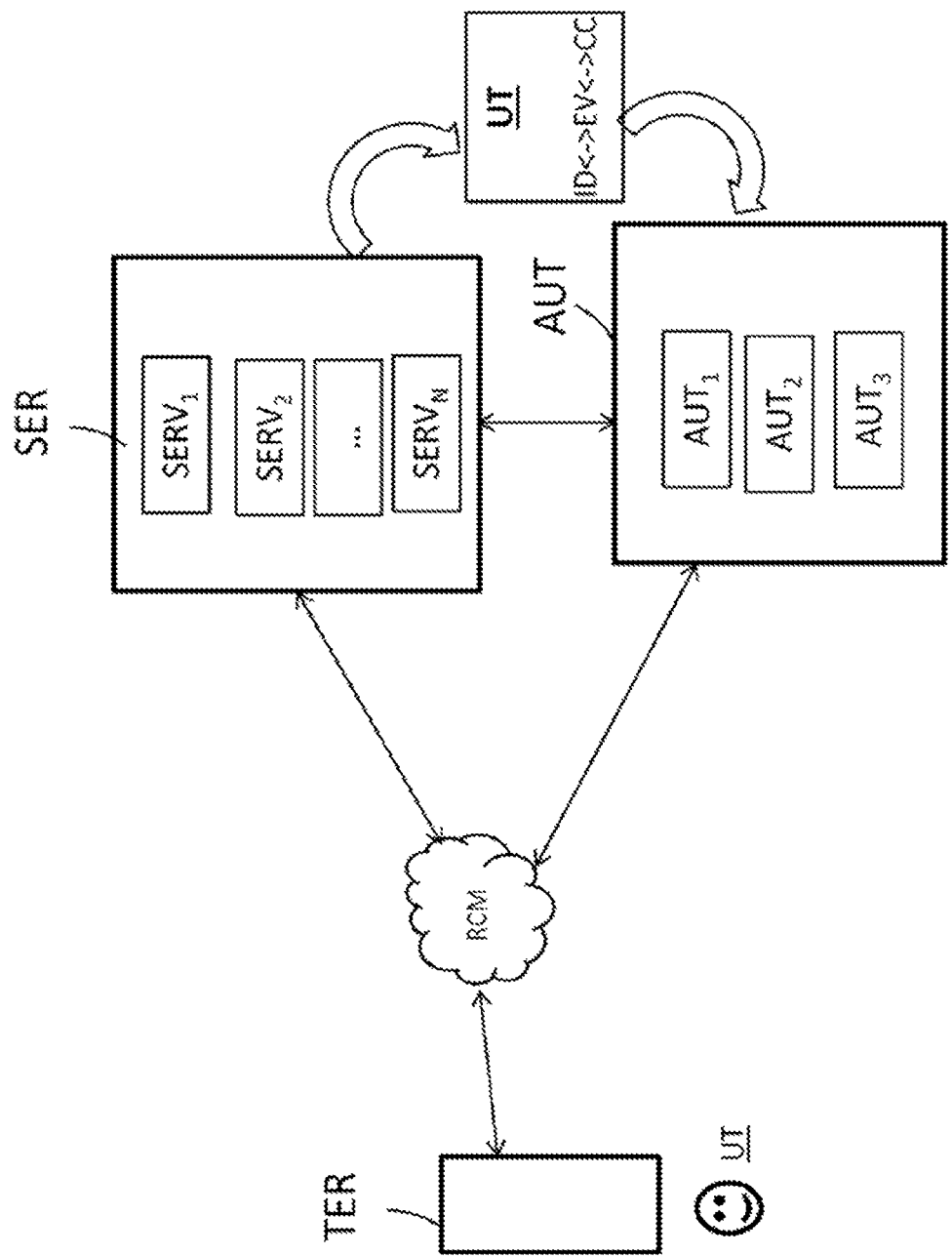
FIG. 1 shows an authentication system according to one embodiment of the invention.

FIG. 1 shows an environment in which the authentication method according to the invention is implemented.

FIG. 1 shows an authentication system comprising:

a communication terminal TER, of smartphone type or even of basic type or of "feature phone" type, that is to say not equipped with Internet access capabilities, a service provision server SER, an authentication device AUT for authenticating a user UT of the terminal TER when accessing a service offered by the server SER.

Although the authentication device AUT is distinct from the server SER in FIG. 1, the authentication device AUT could be integrated into the server SER so as to form a single entity.

The server SER and the authentication device AUT communicate with one another via any type of communication network (not shown). This may be for example an IP (abbreviation for "Internet Protocol") network, an x-DSL, fiber or even 3G, 4G, 5G, etc. network. If the server SER and the authentication device AUT are close to one another, they may also communicate via a wireless local area network, in particular a Wi-Fi or PLC (abbreviation for "power line communication") network.

The communication terminal TER is configured to:

communicate vocally with the server SER in order to record, in the server SER and/or in the authentication device AUT, a voiceprint EV of the user UT in association with an identifier ID of the communication terminal TER, communicate vocally or textually:

with the server SER in order to request access to a service offered in the server SER, with the authentication device AUT in order to authenticate the user UT when accessing the offered service.

Such communication is implemented by way of a mobile communication network RCM, typically a mobile communication network of an operator, of 2G, 3G, 4G, etc. type.

The server SER is configured to provide a plurality of services $SERV_1$ to $SERV_N$. It may be for example a platform of a mobile operator offering a bundle of services, such as for example a service for accessing an archive of communication bills of the user UT, a service for accessing the payment of said user's bills, a service for accessing a community of subscribers, a service for accessing the consultation of a balance of communication units, etc. According to another non-limiting example, the server SER could be a bank server offering a bundle of services, such as for example a service for consulting the bank accounts of the user UT, a payment stopping service, a direct debit service, etc.

Depending on the sensitivity of the data handled when accessing these services, some services may be made accessible through simple authentication of the user UT, while other services may be made accessible through strong authentication of the user UT, and other services still may be made accessible through very strong authentication of the user UT.

The server SER is furthermore configured to record the voiceprint EV of the user UT in the server SER and/or in the authentication device AUT, in association with an identifier ID of the communication terminal TER, following learning of the voice of the user UT communicated via the communication network RCM.

The authentication device AUT is configured, following the receipt, in the server SER via the communication network RCM, of a request to access a service from the terminal TER, to implement, depending on the requested service, either first-level (simple) authentication $AUT_1$ or second-level (strong) authentication $AUT_2$ or third-level (very strong) authentication $AUT_3$. The authentication device AUT is configured to communicate with the terminal TER vocally or textually, via the mobile communication network RCM.

Description of One Embodiment of the Server SER

Figure 2:
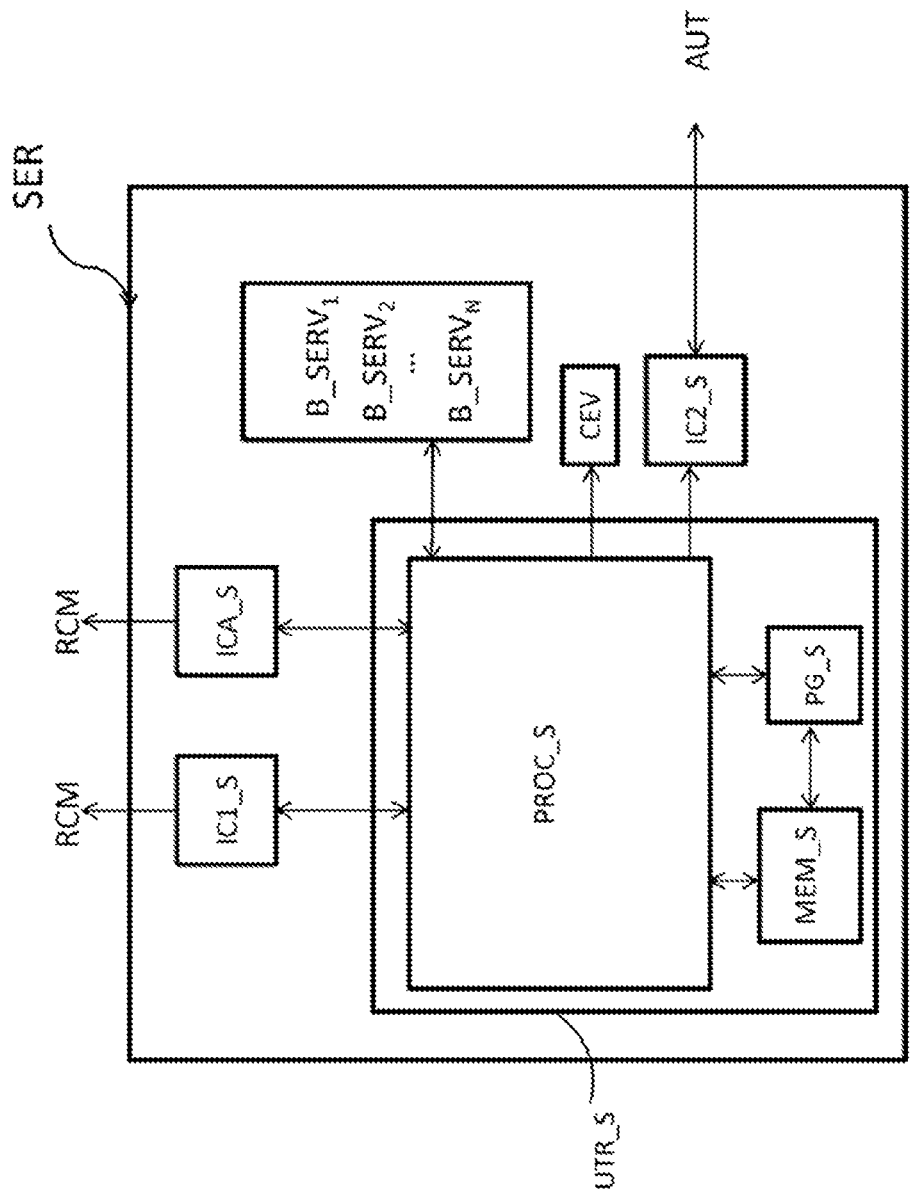
FIG. 2 shows a service provision server in one particular embodiment of the invention.

FIG. 2 shows the simplified structure of the server SER that is designed to provide services to the user UT via the mobile communication network RCM within the framework of the authentication method that will be described below. It is for example an interactive voice server.

Such a server comprises:
a plurality of service software bricks $B\_SERV_1$ to $B\_SERV_N$,
a voiceprint creation software module CEV,
an audio communication interface ICA_S that is designed to communicate vocally, via the mobile communication network RCM, with the terminal TER of the user UT,
a communication interface IC1_S that is designed to operate in accordance with certain protocols, such as for example SMS and/or DTMF and/or USSD, via the network RCM, and to communicate with the terminal TER of the user UT,
a communication interface IC2_S that is designed to communicate with the authentication device AUT, in accordance for example with the IP (abbreviation for "Internet Protocol"), x-DSL, fiber, 3G, 4G, 5G, etc., Wi-Fi, PLC protocol or the like.

According to one particular embodiment of the invention, the actions executed by the server SER in order to provide the services and create the voiceprints are implemented by instructions of a computer program PG_S. For this purpose, the server SER has the conventional architecture of a computer and comprises in particular a memory MEM_S, a processing unit UTR_S, equipped for example with a processor PROC_S, and driven by the computer program PG_S stored in memory MEM_S. The computer program PG_S comprises instructions for implementing the service provision and voiceprint creation actions implemented within the framework of the authentication method that will be described below when the program is executed by the processor PROC_S, according to any one of the particular embodiments of the invention.

On initialization, the code instructions of the computer program PG_S are for example loaded into a RAM memory (not shown) before being executed by the processor PROC_S. The processor PROC_S of the processing unit UTR_S in particular implements the actions of the service provision and voiceprint creation method according to the instructions of the computer program PG_S.

Description of One Embodiment of the Authentication Device AUT

Figure 3:
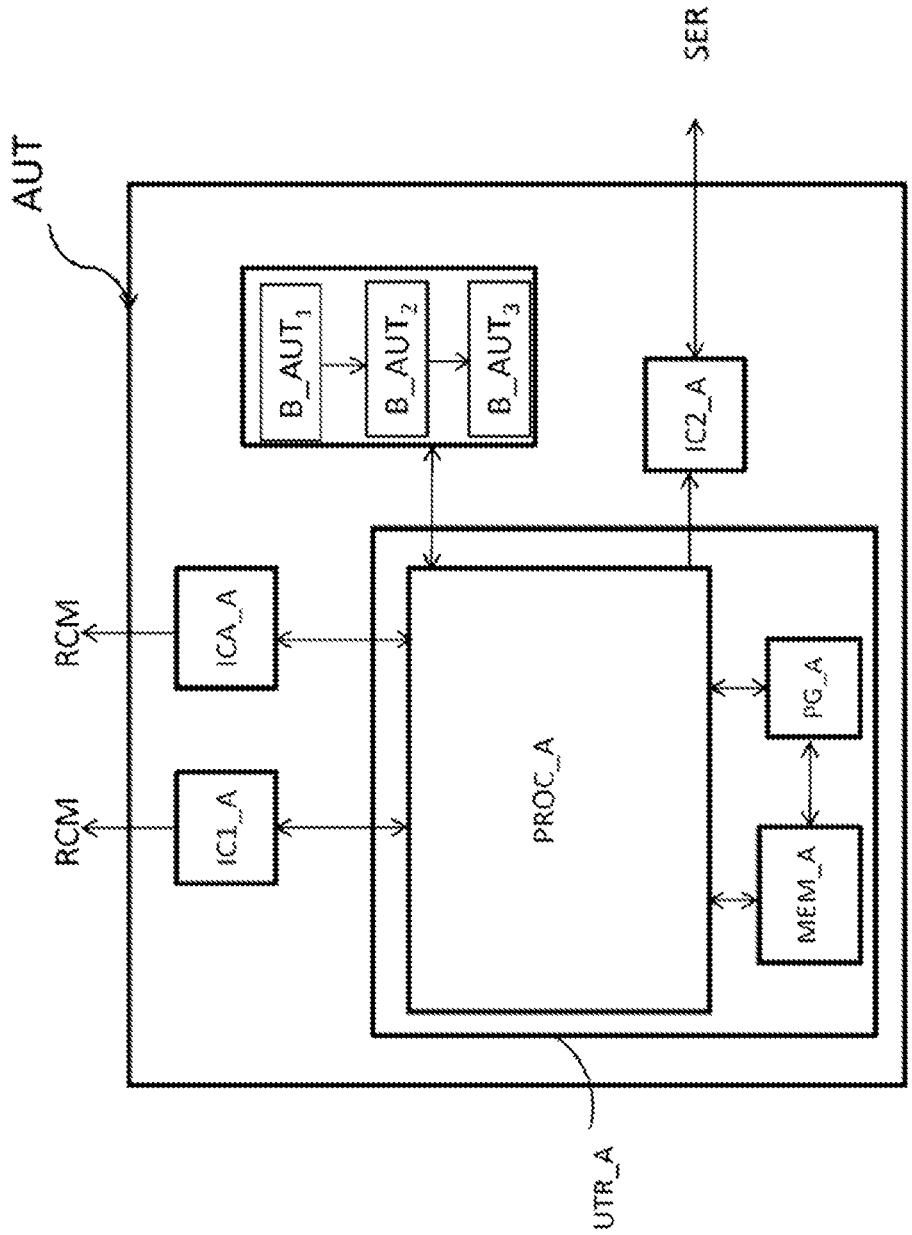
FIG. 3 shows an authentication device in one particular embodiment of the invention.

FIG. 3 shows the simplified structure of the authentication device AUT that is designed to authenticate the user UT, via the mobile communication network RCM, when the user UT wishes to access, via his terminal TER, a service offered by the server SER.

Such an authentication device AUT comprises:
three authentication software bricks $B\_AUT_1$, $B\_AUT_2$, $B\_AUT_3$,
an audio communication interface ICA _A that is designed to communicate vocally, via the mobile communication network RCM, with the terminal TER of the user UT,
a communication interface IC1_A that is designed to operate in accordance with certain protocols, such as for example SMS and/or DTMF and/or USSD, via the network RCM, and to communicate with the terminal TER of the user UT,
a communication interface IC2_A that is designed to communicate with the server SER, in accordance for example with the IP, x-DSL, fiber, 3G, 4G, 5G, etc., Wi-Fi, CPL protocol or the like.

According to one particular embodiment of the invention, the actions executed by the authentication device AUT in order to authenticate the user UT are implemented by instructions of a computer program PG_A. For this purpose, the authentication device AUT has the conventional architecture of a computer and comprises in particular a memory MEM_A, a processing unit UTR_A, equipped for example with a processor PROC_A, and driven by the computer program PG_A stored in memory MEM_A. The computer program PG_A comprises instructions for implementing the authentication method that will be described below when the program is executed by the processor PROC_A, according to any one of the particular embodiments of the invention.

On initialization, the code instructions of the computer program PG_A are for example loaded into a RAM memory (not shown) before being executed by the processor PROC_A. The processor PROC_A of the processing unit UTR_A implements in particular the actions of the authentication method according to the instructions of the computer program PG_A.

Description of One Embodiment of the Communication Terminal TER

Figure 4:
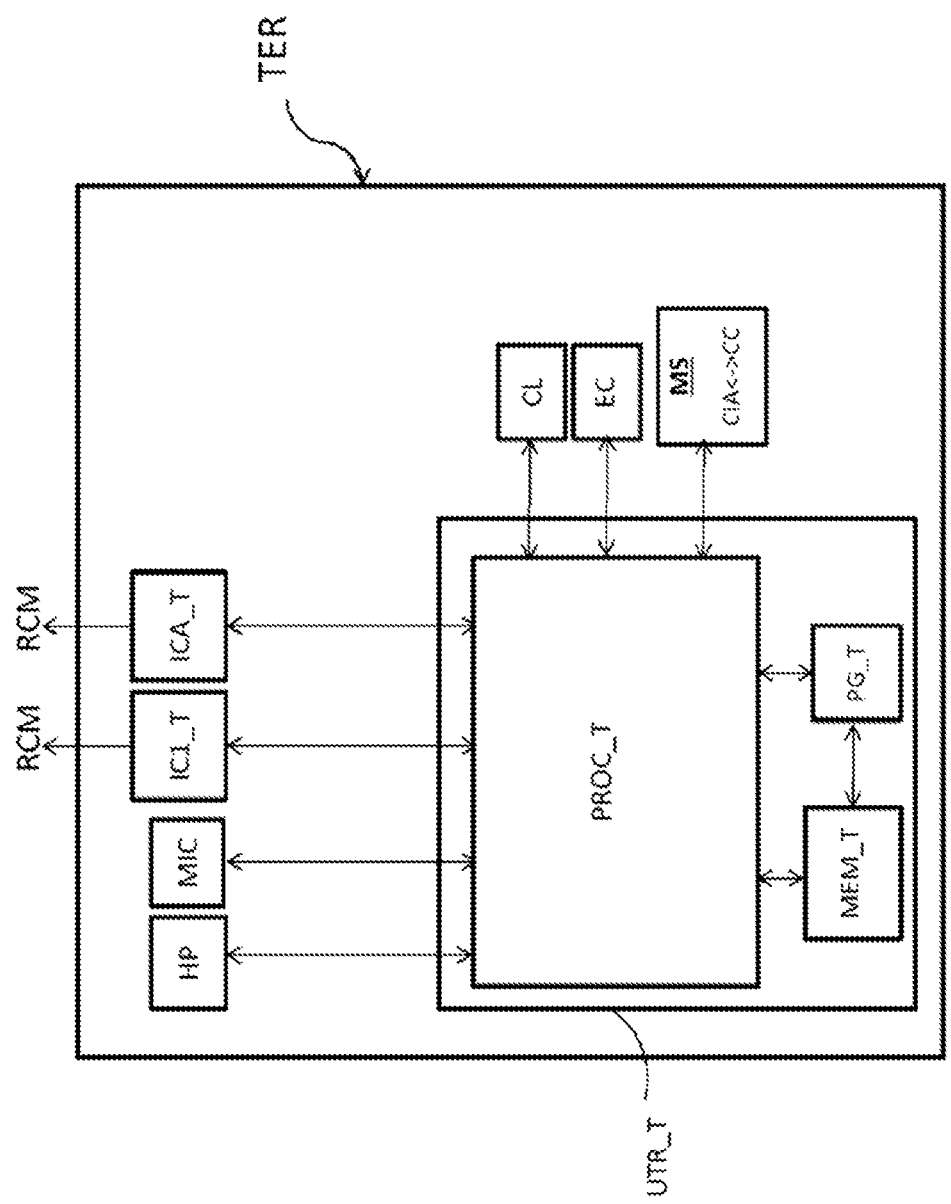
FIG. 4 shows a communication terminal in one particular embodiment of the invention.

FIG. 4 shows the simplified structure of the communication terminal TER designed to access a service offered in the server SER, through authentication of the user UT of this terminal.

As already mentioned above, the communication terminal TER is a smartphone or else a basic terminal or feature phone. If the terminal TER is a basic terminal, it is not equipped with capabilities for accessing an Internet or Intranet network.

The communication terminal TER comprises:
a display screen EC,
a loudspeaker HP,
a microphone MIC,
a keyboard CL, a security module MS, such as for example a subscriber identification card CIA of SIM or USIM type, which is associated with a confidential code CC, an audio communication interface ICA_T that is designed to communicate vocally, via the mobile communication network RCM, with the server SER or the authentication device AUT, a communication interface IC1_T that is designed to operate in accordance with certain protocols, such as for example SMS and/or DTMF (abbreviation for "dual-tone multi-frequency") and/or USSD, via the network RCM, and to communicate with the server SER and the authentication device AUT.

According to one particular embodiment of the invention, the actions executed in order to access a service offered in the server SER and allow the authentication of the user UT are implemented by instructions of a computer program PG_T. For this purpose, the terminal TER has the conventional architecture of a computer and comprises in particular a memory MEM_T, a processing unit UTR_T, equipped for example with a processor PROC_T, and driven by the computer program PG_T stored in memory MEM_T. The computer program PG_T comprises instructions for implementing the voiceprint creation, the service access and the authentication of the user UT that will be described below when the program is executed by the processor PROC_T, according to any one of the particular embodiments of the invention. On initialization, the code instructions of the computer program PG_T are for example loaded into a RAM memory (not shown) before being executed by the processor PROC_T. The processor PROC_T of the processing unit UTR_T in particular implements the voiceprint creation, the service access and the authentication of the user UT according to the instructions of the computer program PG_T.

Description of One Embodiment of the Authentication Method

Figure 5A:
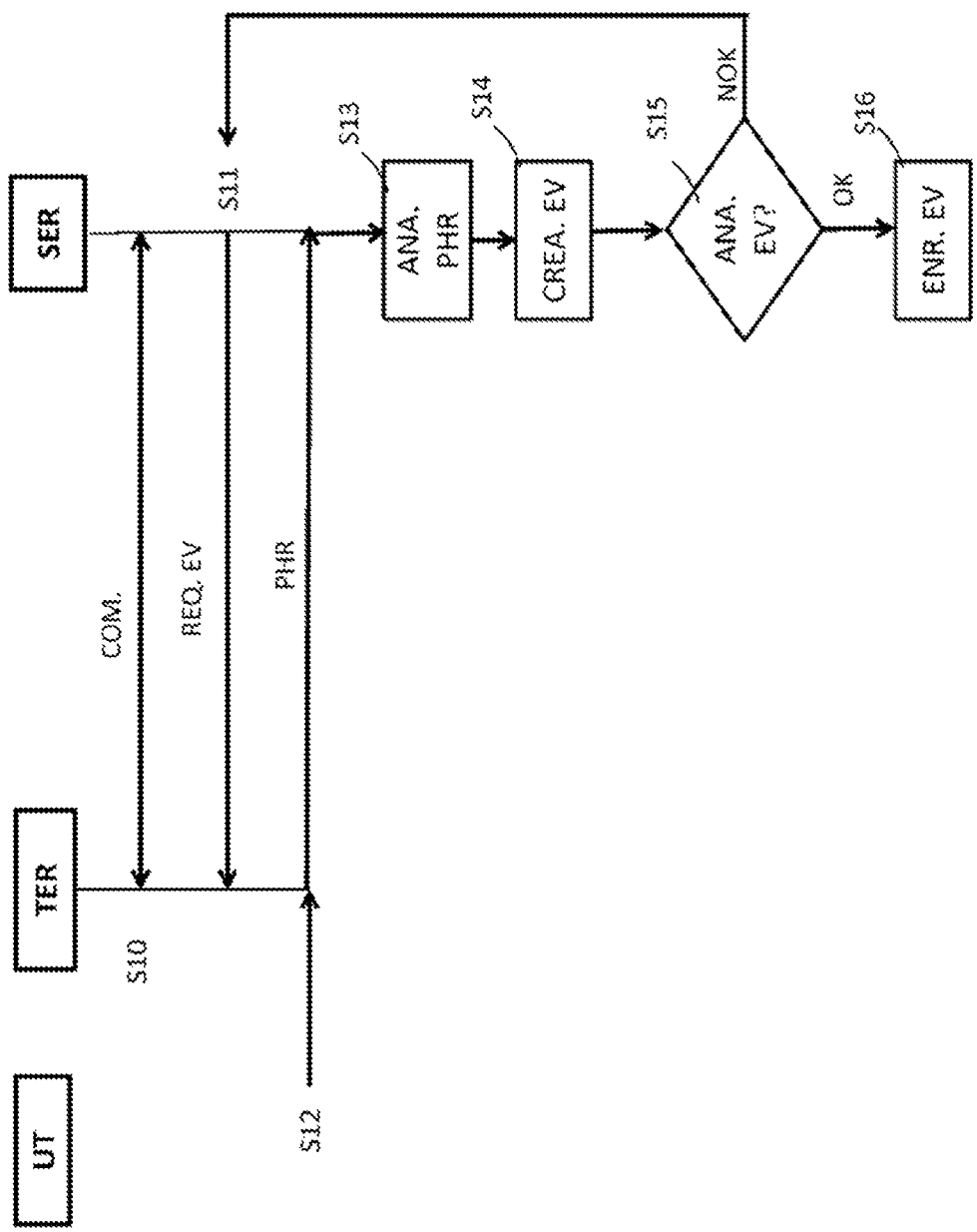
FIG. 5A shows the main actions implemented in the voiceprint creation method that precedes the authentication, according to one particular embodiment of the invention.
Figure 5B:
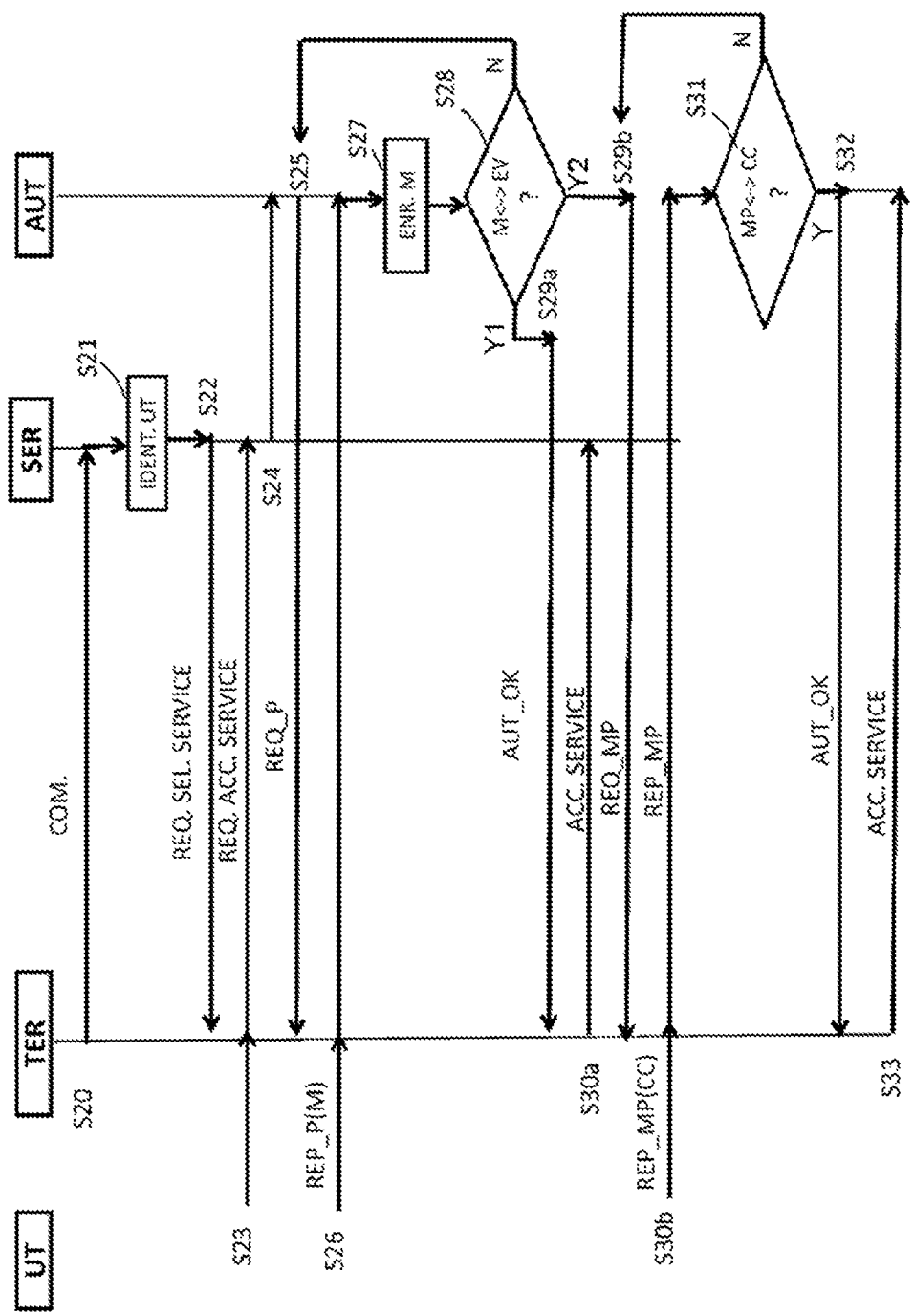
FIG. 5B shows the main actions implemented in the authentication method, according to one particular embodiment of the invention.

With reference to FIGS. 5A and 5B, a description will now be given of the sequence of an authentication method according to one embodiment of the invention, implemented in the authentication system of FIG. 1.

Such an authentication method requires the prior implementation of the creation of a voiceprint EV of the user UT, which is described in FIG. 5A.

In S10, a communication COM is established between the terminal TER and the server SER. The communication may be established on the initiative of the server SER, via its communication interface ICA_S, provided that the server SER has prior knowledge of the MSISDN number associated with the subscriber identification card CIA of the user UT. The MSISDN number has for example been stored beforehand in a memory, either of the server SER or of the authentication device AUT, or in another device accessible to the server SER and the authentication device AUT. As a variant, it may be the IMSI (abbreviation for "International Mobile Subscriber Identity") number, which is the "private" identifier of the user UT contained in the subscriber identification card CIA. Such communication is voice communication. The MSISDN number or the IMSI number is an identifier ID of the communication terminal TER. As a variant, the communication may be established 510 on the initiative of the terminal TER. Such communication may be voice communication, the user UT dialing a telephone number assigned to the server SER on the keyboard CL of the terminal TER, the communication being initiated by the communication interface ICA_T of the terminal TER, via the network RCM. According to another variant, the communication may be implemented by the user UT by typing an SMS or USSD code specific to the server SER on the keyboard CL of the terminal TER, the communication then being initiated by the communication interface IC1_T of the terminal TER, via the network RCM, to the server SER. Upon receipt, by the server SER, of the communication from the terminal TER, provided that the server SER has prior knowledge of the MSISDN or IMSI number associated with the subscriber identification card CIA of the user UT, the user UT is authenticated by the server SER.

In S11, the server SER then sends a voiceprint creation request REQ. EV to the user UT, via the network RCM. If the establishment of the communication in S10 is a voice call, the request REQ. EV is a voice request and is sent to the terminal TER by way of the communication interface ICA_S via the network RCM. It is for example of the type: "please record your voiceprint. To begin, please say your first and last name". If the establishment of the communication in S10 is established using a DTMF, SMS or USSD code, the server SER makes, in response, a telephone call to the terminal TER via the network RCM, by way of the communication interface ICA_S. When the terminal TER is picked up, the server SER then sends the abovementioned voice request REQ. EV. As an alternative, when the terminal TER is picked up, the server SER vocally asks the user UT: "To record your voiceprint, press "1"". The user UT then presses "1" on the keyboard CL of his terminal TER, and the server SER then sends the abovementioned voice request REQ. EV. According to yet another non-limiting embodiment, if the establishment of the communication in S10 is implemented using a DTMF, SMS or USSD code, the server SER sends, in response, to the terminal TER, by way of its communication interface IC1_S and via the network RCM, a USSD or SMS message inviting the user UT either to contact the server SER by telephone to create his voiceprint, or to type a specific code to directly access, in the server SER, an interactive voice-based voiceprint creation service that will then generate the abovementioned voice request REQ. EV. In response to request REQ. EV, the user UT speaks the required sentence PHR, which is sent, in S12, to the server SER, by way of the communication interface ICA_T, via the network RCM. Upon receipt of this sentence, the voiceprint creation module CEV of the server SER analyzes the spoken sentence in S13 and creates, in S14, a voiceprint EV in accordance with at least one physical characteristic of the user UT. Said at least one physical characteristic belongs to the group comprising intonation, speed, and the accent with which the user UT speaks the sentence PHR. In S15, the server SER analyzes the voiceprint. If the voiceprint has not been created correctly, steps S11 to S15 are iterated at least once, the server SER then asking the user UT to say another sentence, for example: "the duckling swims in the river".

According to another example, the server SER may also ask the user UT a question, such as for example: "What is your date of birth?". If the voiceprint EV has been created correctly, it is recorded, in S16, in the server SER and/or in the authentication device AUT and/or in a database accessible to the server SER and the authentication device AUT. The voiceprint EV is recorded in correspondence with the identifier ID of the terminal TER, which is the abovementioned MSISDN or IMSI number in the proposed embodiment.

At the end of step S16, the server SER may send a message confirming the creation of the voiceprint EV to the user UT. The message may be a voice, SMS or even USSD message.

With reference to FIG. 5B, a description will now be given of a method for authenticating a user UT who requests access to a service offered by the server SER.

In S20, the user UT sends, to the server SER, a communication request COM to communicate with the server SER using his terminal TER. Such communication may be established in voice mode or by sending, to the server SER, an SMS or USSD message, as explained above in S10. The server SER identifies, in S21, the user UT through the MSISDN or IMSI number contained in the request S20. To identify the user UT, the server SER accesses a database containing information identifying the user UT (last name, first name, address, etc.) matched with the MSISDN or IMSI number. As a variant, the server SER sends a request to the authentication device AUT, via its communication interface IC2_S, said request containing the MSISDN or IMSI number of the user UT. The authentication device AUT activates the authentication brick B_AUT$_1$, which authenticates the user UT in accordance with a first level, using the received MSISDN or IMSI number and which returns a message to the server SER, via the communication interface IC2_A, according to which the user UT has been authenticated correctly.

In S22, the voice server SER sends, to the terminal TER, a request REQ.SEL.SERVICE to select a service offered by the server SER. Such a request is for example a voice message of the type: "to access the service SERV$_1$, say "1", to access the service SERV$_2$, say "2", to access the service SERV$_3$, say "3"". The message is then sent by the communication interface ICA_S of the server SER, via the network RCM. According to another example, such a request is a text message of the type: "to access the service SERV$_1$, press "1", to access the service SERV$_2$, press "2", to access the service SERV$_3$, press "3"" if it is an SMS message, or else of the type: "to access the service SERV$_1$, press "#001#", to access the service SERV$_2$, press "#002#", to access the service SERV$_3$, press "#003#"" if it is a USSD message. In S23, according to one embodiment, the user UT speaks, into the microphone MIC of his terminal TER, the code associated with the service that he wishes to access. According to another embodiment, the user UT types, on the keyboard CL of his terminal TER, the code associated with the service that he wishes to access, thereby triggering the sending of a request to access the service REQ. ACC. SERVICE to the server SER, via the network RCM. The code that is typed may be a DTMF, SMS or USSD code. The request REQ. ACC. SERVICE contains the abovementioned MSISDN or IMSI number and the code associated with the service requested by the user UT, in the example "1", "2" or "3" or else "#001#", "#002#" or "#003#".

Upon receipt of the request REQ. ACC. SERVICE, in S24, the server SER transmits this request to the authentication device AUT. If the requested service requires first-level authentication AUT$_1$, the authentication device AUT, having already authenticated the user UT beforehand, sends a response to the server SER, authorizing it to let the user UT access the requested service. Such a step is conventional and is therefore not described in FIG. 5B. If the requested service requires second-level (strong) authentication AUT$_2$, in S25, the authentication device AUT sends, to the terminal TER, an authentication request REQ_P requesting authentication by speaking at least one word. This is for example the name of the user UT communicated beforehand during the voiceprint creation phase illustrated in FIG. 5A, or else one of the sentences communicated by the user UT during this phase. According to another embodiment, the request REQ_P may be sent directly by the server SER after having been received thereby from the authentication device AUT. Such a request is for example a voice message of the type: "Please say at least one word". The message is then sent by the communication interface ICA_A of the authentication device AUT, via the network RCM, to the terminal TER. According to another example, such a request is a text message of the type: "please call the server SER back and say at least one word M" or else "the server SER will call you back in 1 minute to ask you to say at least one word".

In S26, upon receipt of the request REQ_P in the terminal TER, the user UT speaks said at least one word M, said at least one word being transmitted to the authentication device AUT directly in response REP_P to the request REQ_P or else indirectly via the server SER, if the user UT has called the server SER back or has been called back by the server SER to speak said at least one word.

In S27, the authentication device records said at least one word M. In S28, the software brick B_AUT$_2$ of the authentication device AUT checks whether the spoken word M corresponds to the print EV created beforehand. In particular, the software brick B_AUT$_2$ checks said word M against at least one of the physical characteristics of the user UT, such as for example intonation, speed or even the accent with which the user UT spoke said word M. If there is not a match between the word M and the voiceprint EV (branch "N" in FIG. 5B), steps S25 to S28 are for example iterated a predefined number of times. According to another example, the authentication device AUT sends a voice or text message to the terminal TER of the user UT, telling him to recreate a voiceprint again. If, on the other hand, there is indeed a match between the word M and the voiceprint EV (branch "Y1" in FIG. 5B), and if a third-level authentication AUT$_3$ is not necessary for the service requested by the user UT, the authentication device AUT sends, in S29a, to the terminal TER, a voice or text message AUT_OK, confirming to said user that the strong authentication has succeeded for the requested service. According to another embodiment, the message AUT_OK may be sent directly by the server SER after having been received thereby from the authentication device AUT. In S30a, the user UT then accesses the requested service via his terminal TER. The message AUT_OK is not necessarily sent, the user UT then accessing the requested service directly, via his terminal TER, once the match between said at least one word and the voiceprint EV has been established in S28.

If there is indeed a match between the word M and the voiceprint EV and the requested service requires third-level (very strong) authentication AUT$_3$ (branch "Y2" in FIG. 5B), in S29b, the authentication device AUT sends, to the terminal TER, an additional authentication request. This is a password request REQ_MP requesting a password, for example the abovementioned confidential code CC, typically a PIN code, associated with the subscriber identity card CIA of the user UT and recorded beforehand in association with the MSISDN or IMSI number of the user UT and in association with the voiceprint EV of said user, either in the server SER or in the authentication device AUT, or even in a database accessible to the server SER and the authentication device AUT. According to another embodiment, the request REQ_MP may be sent directly by the server SER after having been received thereby from the authentication device AUT. Such a request is for example a voice message of the type: "Please say/type your confidential code CC".

The message is then sent by the communication interface ICA_A of the authentication device AUT, via the network RCM, to the terminal TER. According to another example, such a request is a text message of the type: "please call the server SER back and say your confidential code CC" or else "the server SER will call you back in 1 minute to ask you to say your confidential code CC" or else "please type your confidential code CC".

In S30b, upon receipt of the request REQ_MP in the terminal TER, the user UT speaks or types the confidential code CC depending to the embodiment that is implemented, said confidential code CC being transmitted to the authentication device AUT directly in response REP_MP to the request REQ_MP, either via the communication interface ICA_T of the terminal TER if the confidential code CC is spoken, or via the communication interface IC1_T of the terminal TER if the confidential code CC is typed (SMS, USSD or DTMF code). As an alternative, the confidential code CC is transmitted indirectly via the server SER, if the user UT has called the server SER back or has been called back by the server SER to say or type the confidential code CC.

In S31, the software brick B_AUT$_3$ of the authentication device AUT checks whether the spoken or typed confidential code corresponds to the confidential code CC recorded beforehand. If there is not a match between the two codes (branch "N" in FIG. 5B), steps S29b and those that follow are for example iterated with a number of iterations limited for example to 2. According to another example, the authentication device AUT sends a voice or text message to the terminal TER of the user UT telling him access to the requested service has been denied. If, on the other hand, there is indeed a match between the two confidential codes (branch "Y" in FIG. 5B), the authentication device AUT sends, in S32, to the terminal TER, a voice or text message AUT_OK confirming thereto that the very strong authentication has succeeded for the requested service. According to another embodiment, the message AUT_OK may be sent directly by the server SER after having been received thereby from the authentication device AUT. In S33, the user UT then accesses the requested service via his terminal TER. The message AUT_OK is not necessarily sent in S32, the user UT then accessing the requested service directly, via his terminal TER, once the match between the confidential codes has been established in S31.

The invention claimed is:

1. A method for authenticating a user of a service on a communication terminal, said method comprising, on the communication terminal, upon establishing an audio communication with a server:
   sending via said audio communication, to said server, a request to access said server, said request comprising a first identifier associated with the communication terminal and a second identifier associated with a service requested in said server,
   receiving via said audio communication, from an authentication device, an authentication request asking the user to speak at least one word,
   communicating via said audio communication at least one word spoken by the user to the authentication device, and
   in response to said communication of said at least one spoken word, said at least one spoken word corresponding to a voiceprint of the user speaking at least one first word, said voiceprint being recorded beforehand in association with the identifier of said communication terminal receiving, from the authentication device, an additional authentication request for additional authentication of the user.

2. The method of claim 1, wherein the received additional authentication request comprises a password request, to which the communication terminal communicates, in response, the requested password in text or voice form.

3. The method of claim 1, wherein the second identifier associated with the requested service belongs to the group comprising a dual-tone multi-frequency tone code, a USSD code, and an SMS message.

4. The method of claim 1, wherein the at least one spoken word that is communicated to the authentication device is identified according to at least one physical characteristic of the user.

5. The method of claim 4, wherein said at least one physical characteristic belongs to the group comprising intonation, speed, and an accent with which the user speaks the word.

6. The method of claim 1, wherein said first identifier is a mobile subscriber number of the communication terminal.

7. The method of claim 6, wherein said mobile subscriber number of the communication terminal is a Mobile Station International Subscriber Directory Number (MSISDN) or an International Mobile Subscriber Identity (IMSI) number of the communication terminal.

8. A communication terminal comprising a processor configured to implement the following upon establishing an audio communication with a server:
   sending via said audio communication, to said server, a request to access said server, said request comprising a first identifier associated with the communication terminal and a second identifier associated with a service requested in said server,
   receiving via said audio communication, from an authentication device, an authentication request asking the user to speak at least one word,
   communicating via said audio communication at least one word spoken by the user to the authentication device, and
   in response to said communication of said at least one spoken word, said at least one spoken word corresponding to a voiceprint of the user speaking at least one first word, said voiceprint being recorded beforehand in association with the identifier of said communication terminal receiving, from the authentication device, an additional authentication request for additional authentication of the user.

9. The communication terminal of claim 8, said communication terminal being a feature phone.

10. An authentication device comprising a processor configured to implement the following, upon establishing an audio communication with a server:
    receiving via said audio communication, from said server, a first identifier associated with a communication terminal and a second identifier associated with a service requested in said server,
    sending via said audio communication, to the communication terminal associated with the first identifier, an authentication request asking a user of said communication terminal to speak at least one word,
    receiving via said audio communication the at least one spoken word from the terminal, said at least one spoken word corresponding to a voiceprint of the user recorded beforehand in association with the first identifier, and
    in response to said reception of said at least one spoken word, said at least one spoken word corresponding to a voiceprint of the user speaking at least one first word, said voiceprint being recorded beforehand in association with the identifier of said communication terminal, sending, to the communication terminal, an additional authentication request for additional authentication of the user.

11. The authentication device of claim 10, wherein the additional authentication request comprises a password request, to which the terminal communicates, in response, the requested password in text or voice form.

12. The authentication device of claim 10, wherein the second identifier associated with the requested service belongs to the group comprising a dual-tone multi-frequency tone code, a USSD code, and an SMS message.

13. The authentication device of claim 10, wherein said processor is further configured for determining a correspondence between the at least one spoken word and said voiceprint of the user speaking said at least one first word, said determining taking into account at least one physical characteristic of the voice of the user.

14. The authentication device of claim 13, wherein said at least one physical characteristic belongs to the group comprising intonation, speed, and an accent with which the user speaks the word.

15. An authentication system comprising the communication terminal of claim 8, further comprising:
the authentication device comprising a processor configured to implement the following:
receiving via said audio communication, from said server said first identifier associated with said communication terminal and said second identifier associated with said service requested in said server,
sending via said audio communication, to the communication terminal associated with the first identifier, said authentication request asking said user of said communication terminal to speak at least one word,
receiving via said audio communication said at least one spoken word from the communication terminal; and
in response to said reception of said at least one spoken word, said at least one spoken word corresponding to said voiceprint of the user speaking said at least one first word, said voiceprint being recorded beforehand in association with the
identifier of said communication terminal, sending, to the communication terminal, an additional authentication request for additional authentication of the user.

16. The authentication system of claim 15, wherein the received additional authentication request comprises a password request, to which the communication terminal communicates, in response, the requested password in text or voice form.

17. The authentication system of claim 15, wherein the second identifier associated with the requested service belongs to the group comprising a dual-tone multi-frequency tone code, a USSD code, and an SMS message.

18. The authentication system of claim 15, wherein the at least one spoken word that is communicated to the authentication device is identified according to at least one physical characteristic of the user.

19. The authentication system of claim 18, wherein said at least one physical characteristic belongs to the group comprising intonation, speed, and an accent with which the user speaks the word.

* * * * *